Aug. 25, 1925.

G. H. GILMAN 1,551,098

DRILLING APPARATUS

Original Filed Sept. 7, 1915   7 Sheets-Sheet 1

Inventor:
George H. Gilman,
by Emery, Booth, Janney & Varney
Attys

Aug. 25, 1925.

G. H. GILMAN 1,551,098

DRILLING APPARATUS

Original Filed Sept. 7, 1915    7 Sheets-Sheet 2

Inventor:
George H. Gilman.
by Emery, Booth, Janney & Varney.
Attys

Aug. 25, 1925.

G. H. GILMAN

DRILLING APPARATUS

Original Filed Sept. 7, 1915      7 Sheets-Sheet 3

Inventor:
George H. Gilman,
by Emery, Booth, Janney & Varney
Attys

Aug. 25, 1925.

G. H. GILMAN 1,551,098

DRILLING APPARATUS

Original Filed Sept. 7, 1915     7 Sheets-Sheet 5

Inventor:
George H. Gilman,
by Emery, Booth, Janney & Varney
Attys

Aug 25, 1925.

G. H. GILMAN

1,551,098

DRILLING APPARATUS

Original Filed Sept. 7, 1915   7 Sheets-Sheet 6

Inventor:
George H. Gilman,
by Emery, Booth, Janney, Varney,
Attys

Patented Aug. 25, 1925.

1,551,098

UNITED STATES PATENT OFFICE.

GEORGE H. GILMAN, OF BOSTON, MASSACHUSETTS, ASSIGNOR TO SULLIVAN MACHINERY COMPANY, OF BOSTON, MASSACHUSETTS, A CORPORATION OF MASSACHUSETTS.

DRILLING APPARATUS.

Application filed September 7, 1915, Serial No. 49,140. Renewed March 21, 1924.

*To all whom it may concern:*

Be it known that I, GEORGE H. GILMAN, a citizen of the United States, and a resident of Boston, county of Suffolk, and State of Massachusetts, have invented an Improvement in Drilling Apparatus, of which the following description, in connection with the accompanying drawings, is a specification, like characters on the drawings representing like parts.

This invention relates to drilling apparatus and is more particularly, though not exclusively, concerned with a pressure fluid impact or percussive drilling tool having pressure fluid feeding means for advancing the tool toward or retracting it from its work, means for ejecting the cuttings from and cleansing the drilled hole and means for coordinately controlling the tool, its feeding means and the hole clearing means.

My invention will be best understood by reference to the following specification and the accompanying drawings, describing and illustrating a preferred construction of an illustrative embodiment thereof, while its scope will be more particularly pointed out in the appended claims.

Referring to the drawings and to the embodiment of my invention which I have selected for illustration, I have shown a drilling apparatus comprising a drilling tool having a cylinder 21 in which a piston 22 is mounted to reciprocate. This piston may actuate a working tool in any other appropriate manner, but is herein provided with a reduced portion 23, constituting a hammer bar extension adapted to deliver a rapid succession of blows upon the inner end of a drill bit 24 held in a chuck 25 in any suitable manner.

I prefer to rotate the tool during the drilling operation, preferably by rifled slots 26 in the hammer bar extension 23 cooperating with the usual ratchet and pawl mechanism which may be included in the ring 27 which may in turn intermittently rotate the sleeve 28, the chuck 25 and the drill steel 24. The details of the rotating mechanism form no part of the present invention.

The drilling tool may be either the valveless or valved type, but the latter is preferred. The valve may be enclosed in a casing 28' to which pressure fluid is conducted from any suitable source of supply, preferably through control valve mechanism to be hereinafter described. The details of the piston operating valve mechanism form no part of the present invention.

The cylinder is herein provided with a rear cylinder head which preferably takes the form of a head block 29 in which I prefer, as hereinafter described, to concentrate the manual control of the fluid supply ports to the various parts of the apparatus. I preferably provide a tube 30 preferably extending from the head block 29 through an axial perforation in the piston 22 and the hammer bar extension 23 into a longitudinal hole or aperture 31 in the drill steel 24. The tube 30 and the hole 31 may serve to convey cleansing fluid to the cutting end of the drill steel 24. The cleansing fluid may be air, water, a mixture of the two, or any other suitable gaseous or liquid element.

Figures 1, 2:
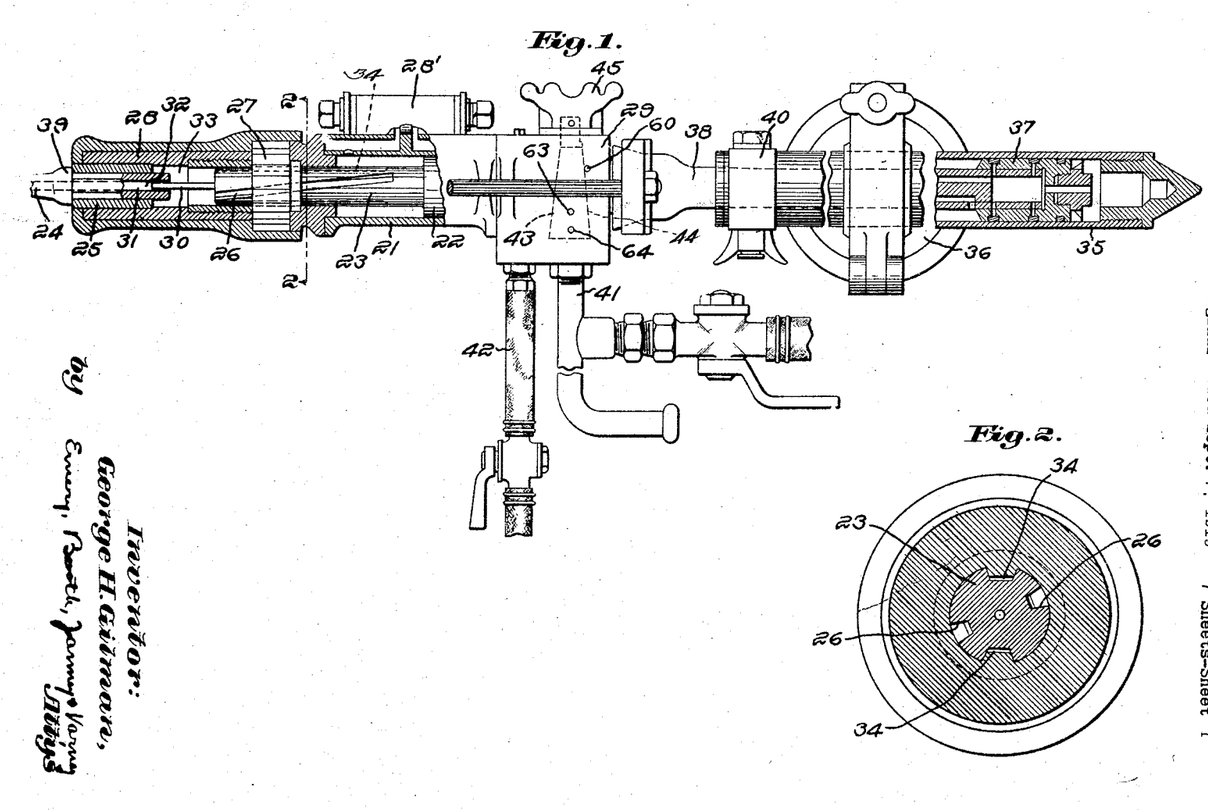
Fig. 1 is a side elevation, partly in section, of a drilling apparatus of the general type known as a stoping drill.
Fig. 2 is a cross-sectional view on the line 2—2 of Fig. 1.
Figure 3:
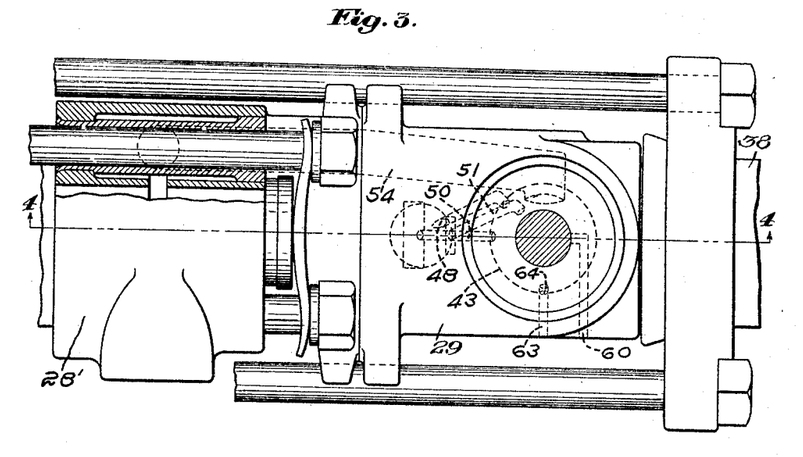
Fig. 3 is a plan view, partly in section, of the control valve and adjacent parts.

I prefer that the aperture 31 in the drill steel 24 shall loosely surround the end of the tube 30 leaving an annular space 32 through which fluid, preferably exhaust air, may pass into the hole 31 from the chamber 33. During the operation of the tool air may be introduced into the chamber 33 from the drill cylinder and in the specific embodiment of my invention shown the rifled slots 26 and straight slots 34 are constructed to provide passages for this purpose which are best shown in Fig. 2.

Co-operating with the drilling mechanism before described I prefer to use feeding mechanism which is preferably of the fluid pressure type. A preferred construction illustrated comprises the cylinder 35, which may be secured to the saddle 36 or any other suitable fixed support, and the piston 37 on the piston rod 38, the latter being preferably operably attached to the drilling mechanism by attachment to the rear of the head block 29. It is clear that pressure fluid admitted to the cylinder 35 behind the piston 37 will force the tool toward the work, while pressure fluid admitted to the front of the piston will retract the tool from the work, the drill steel being retained in its chuck by any suitable drill retainer engaging the drill steel, preferably by engaging the shouldered portion 39. The details of the drill retainer form no part of the present invention.

To control the feeding force of the pressure fluid feeding mechanism I may provide friction mechanism 40 adapted to restrain relative movement of the piston 38 and the cylinder 35. The details of the friction mechanism form no part of the present invention. To supply the apparatus with motive and cleansing fluid I preferably provide a fluid pressure connection 41 which may conduct compressed air from any suitable source and a liquid supply connection 42 which may conduct water, preferably under pressure from any suitable source. I prefer that both air and water connections enter the head block 29 and that passages from each should pass to control valve mechanism which may comprise the rotatable valve 43, the fixed valve seat 44 and the control handle 45.

Before describing the details of construction of the illustrative valve mechanism I will describe the various functions which I prefer that the valve should be capable of performing preferably in the order named.

Figure 10:
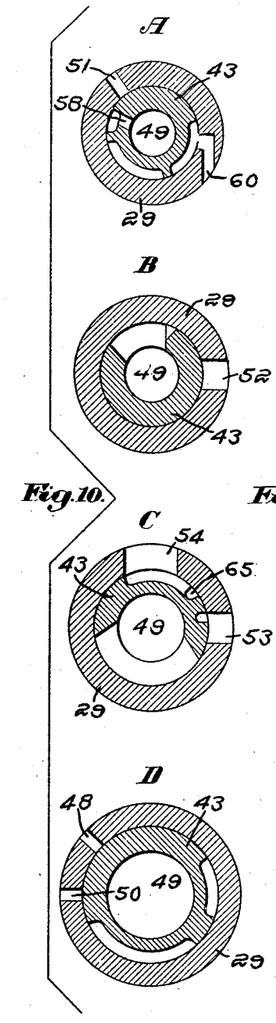
Figures 10 through 19 show ten positions of the control valve mechanism to be fully described hereinafter. Each figure includes four horizontal sections of the valve on the lines A—A, B—B, C—C and D—D of Fig. 8 and includes corresponding sections of the valve seat and ports therein.

One. (Fig. 10.) To cut off both air and water from all parts of the apparatus.

Figure 11:
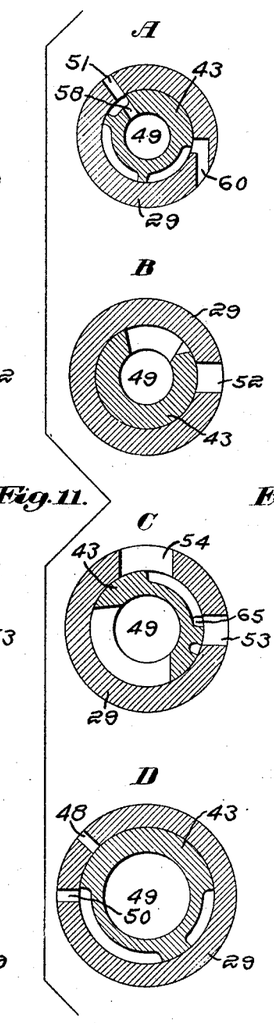

Two. (Fig. 11.) To admit air to the tube 30 leading to the hollow drill steel 24. This clears the steel and tube and is particularly useful prior to stopping the drill so that the drill may be left dry and clean.

Figure 12:
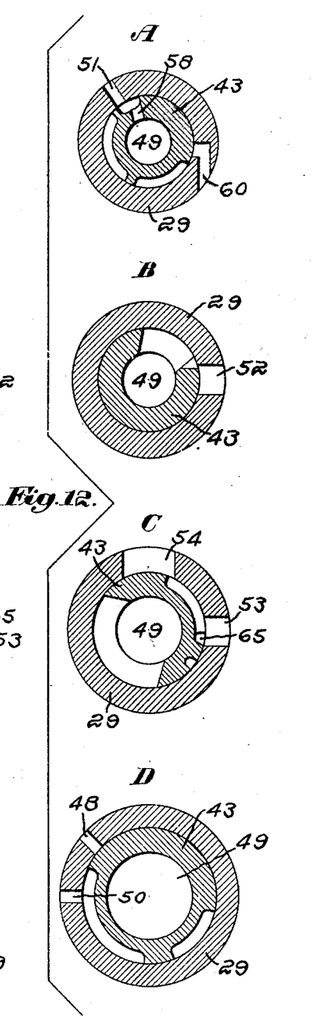

Three. (Fig. 12.) To admit a relatively small amount of air to the feed cylinder 35 in the rear of the piston 37 so that the tool is advanced against the rock to be drilled, while continuing the supply of air to the tube 30.

Figure 13:
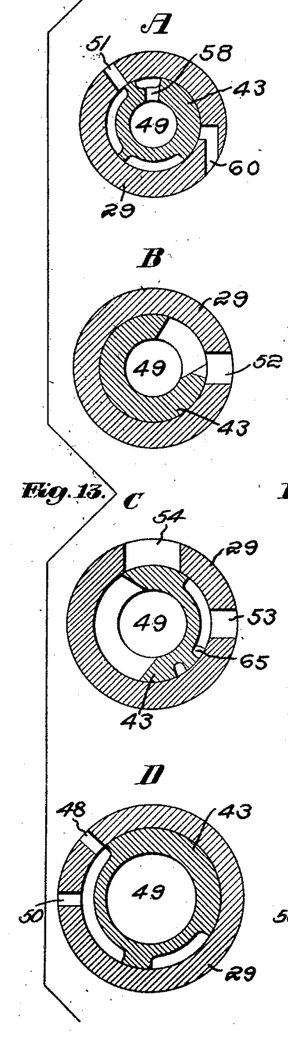

Four. (Fig 13.) To admit more air to the feed cylinder while admitting water to the tube 30 and cutting off the air supply to the tube 30.

Figure 14:
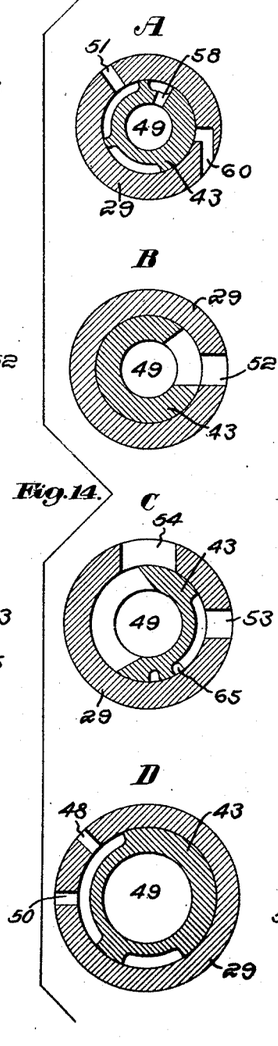

Five. (Fig. 14.) To open wide the feed supply port while leaving open the water supply to the tube 30 and also to admit a limited supply of air to the valve chest 38 to operate the piston 22 relatively slowly.

Figure 15:
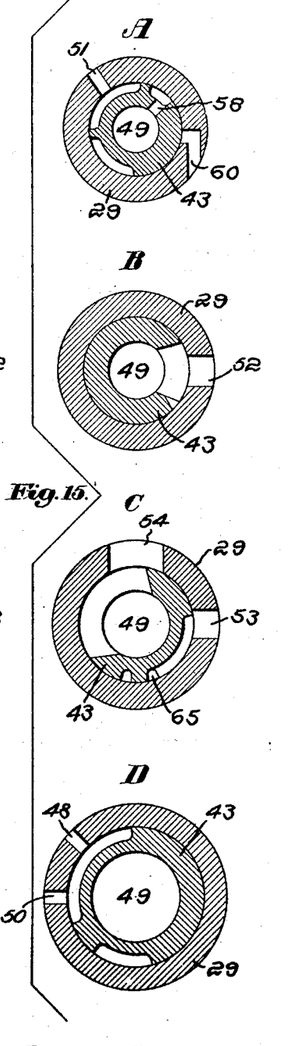

Six. (Fig. 15.) To leave the feed and water ports wide open while opening somewhat wider the port leading to the tool.

Figure 16:
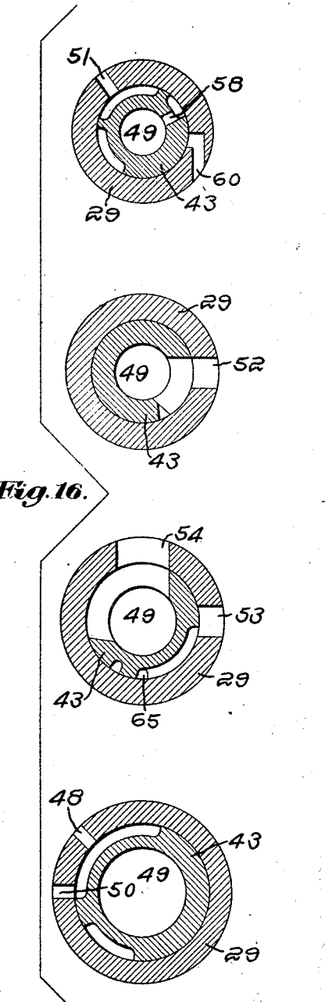

Seven. (Fig. 16.) To open wide the port leading to the tool while leaving open the air port to the feed and the water port to the tube 30.

In this position the tool is operating full speed under full feeding pressure with water supplied to the tube 30. In the fifth, sixth and seventh positions (Figures 14, 15, and 16, respectively) no air is passing through the tube 30, all necessary air being supplied from the chamber 33 through the annular space 32 surrounding the tube and to the hole 31 in the drill steel 24.

Figure 17:
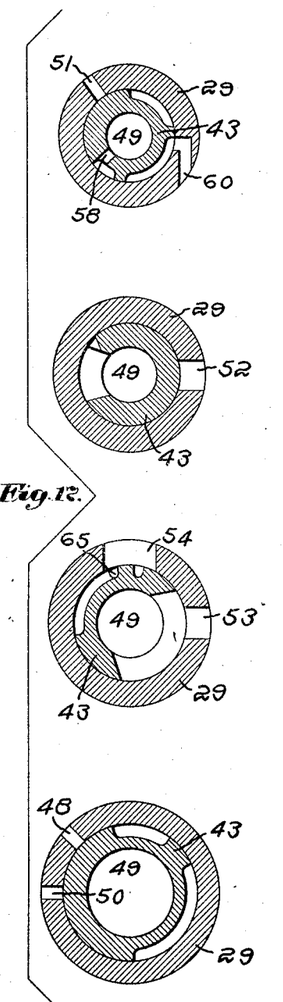

Eighth. (Fig. 17.) To shut off air from the tool and from the advance feed, to exhaust the latter, to shut off both air and water from the tube and to admit air to the front of the cylinder 35 to retract the drilling engine and drill steel.

Figure 18:
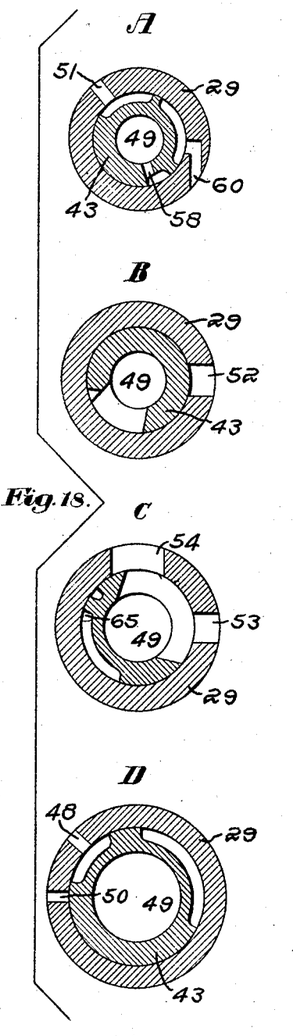

Nine. (Fig. 18.) If the drill steel tends to stick in the hole and resist the reverse feed as in eight, it is of advantage in this position to admit air to the tool while continuing to admit air to the reverse feed, so that the combined percussion and rotation will work the drill steel loose.

Figure 19:
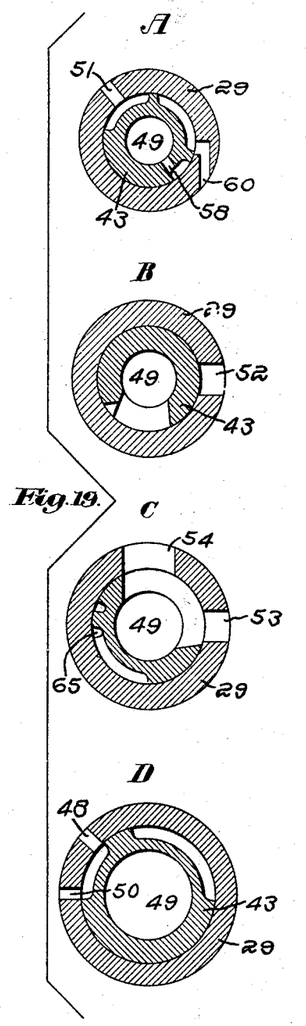

Ten. (Fig. 19.) When in this position the valve leaves the ports to the tool and to the reverse feed open while supplying water to the tube to assist in clearing the drill steel and drilled hole.

The tool may then be stopped by turning the valve to first or neutral position (Fig. 10) but I preferably move to second position before shutting the tool down so that the air blast may thoroughly clean and dry the tube and the drill steel.

Figures 4, 20:
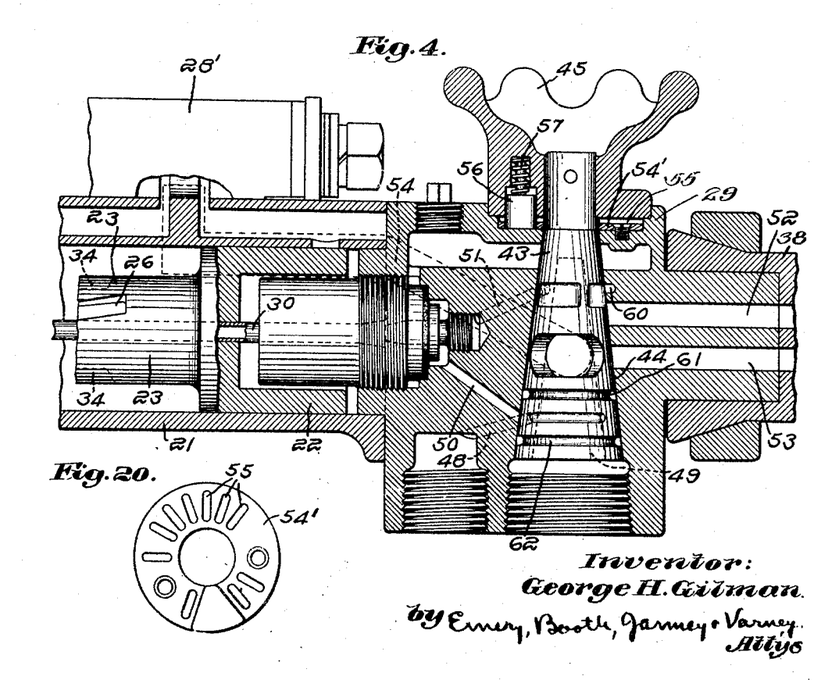
Fig. 4 is a longitudinal section, partly in elevation, on the line 4—4 of Fig. 3.
Fig. 20 is a detail of the valve positioning mechanism.
Figure 5:
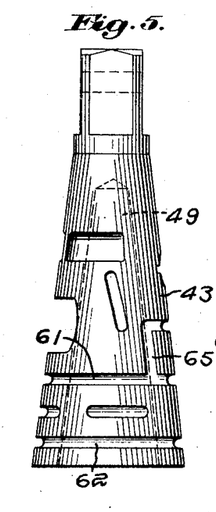
Figs. 5-6-7 and 8 are four elevations of the control valve.
Figures 6, 7:
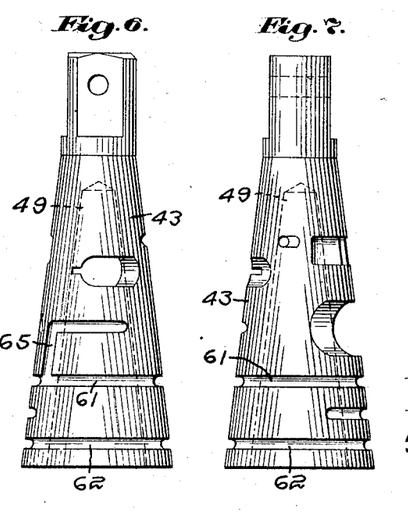

The general arrangement of the valve mechanism will be best understood by reference to Fig. 4 wherein 48 represents a passage for conducting water to the valve 43, and 49 a passage within the valve for conducting air to the various ports of the valve.

The passage 50 conducts water from the valve 43 when the water ports are open to the tube 30.

The air supplied to the valve may be distributed to four passages. The passage 51 conducts air to the tube 30. The passage 52 conducts air to (or exhausts it from) the rear of the feed cylinder 35. The passage 53 conducts air to (or exhausts it from) the front or reverse feed side of the feed cylinder 35. The passage 54 conducts air to the drilling engine.

The valve 43, while controlled by the operator by manual rotation of the handle 45, is preferably provided with means for determining the exact points in which the ports are in proper relation to perform their various functions. To this end I provide valve positioning means, typified by the plate 54', preferably provided with slots or depressions 55 and co-operating with a pawl 56 which is preferably adapted to enter the slots 55 and is preferably pressed by the spring 57, so that while the handle 45 can always be readily turned, a noticeable difference in resistance to rotation thereof informs the operator when the pawl 56 is entered in a slot 55.

As shown in Fig. 20 there are ten slots corresponding with the ten positions of the valve.

It now remains to describe the ports and passages in and co-operating with the valve 43. This will be best understood by reference to Figures 10 through 19, each of which comprises four cross sectional views in which figures marked A show ports admitting air to the tube 30 and the pneumatic feed exhaust ports; figures marked B show the pneumatic feed inlet ports; figures marked C show air ports to the drilling engine and reverse pneumatic feed ports, while figures marked D show ports controlling admission of water to the tube 30. It will be readily understood that in Fig. 10 all inlet ports are closed because shut off by the valve 43. In Fig. 11 the port 51 conducting air to the tube 30 is opened and receives air from the supply 49 through the port 58. In Fig. 12 the port 51 is still open while the port 52 to the feed cylinder is partially opened. In Fig. 13 the port 51 is closed while the port 52 to the feed is opened wider and the water inlet ports 48 and 50 are connected, thereby conducting water to the tube 30. In Fig. 14 the port 51 remains closed, the port 52 to the feed is wide open, the port 54 is slightly opened to operate the tool while water is still supplied to the tube 30 through the port 50. In Fig. 15 the relation of the ports is the same as in Fig. 14 except that the port 54 to the tool is opened wider. In Fig. 16 the relation of the ports is the same as in Fig. 14 except that the port 54 to the tool is wide open. In Fig. 17 all ports are closed except the reverse feed port 53 to the forward end of the feed cylinder to retract the tool. In this position the feed port 52 exhausts into the exhaust port 60 shown on Figs. 3 and 4 and Figures 10 through 19. In Fig. 18 the ports bear the same relation as in Fig. 17 except that the port 54 to the tool is open to operate the tool to assist the retraction thereof. In Fig. 19 the ports are in the same relation as in Fig. 18 except that the ports 48 and 50 are again in communication to admit water to the tube 30.

Figure 8:
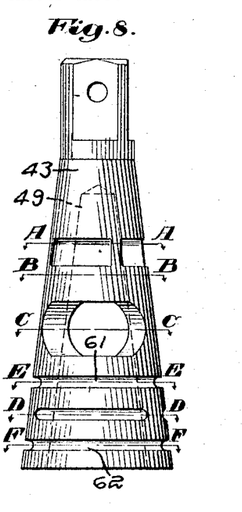
Figure 9:
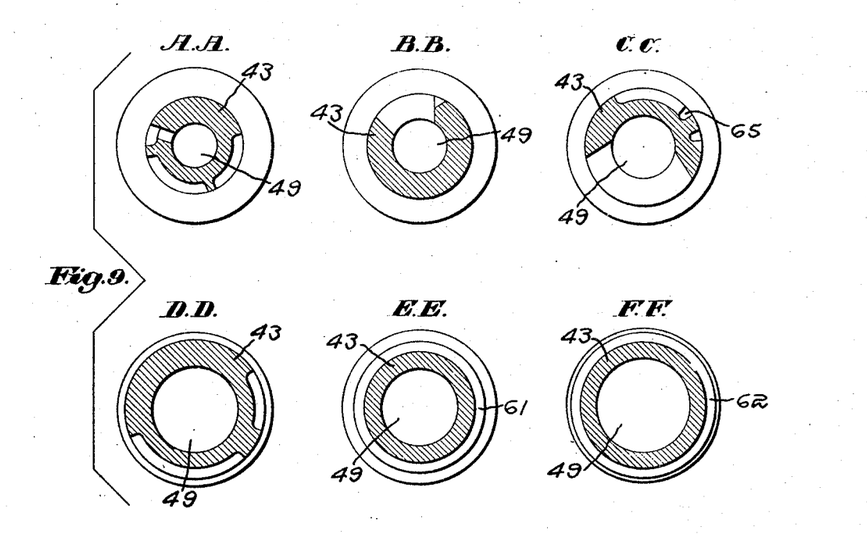
Fig. 9 includes six horizontal sections on line A—A, B—B, C—C, D—D, E—E and F—F respectively of Fig. 8.

I prefer to supply leakage ports 61 and 62 shown in Fig. 8 to prevent any water from leaking into the air supply conduits or ports. These leakage ports are vented by vents 63 and 64 shown in Fig. 3. I may use one of these ports as an exhaust port for the reverse feed by connecting the reverse feed port 53 with the leakage port 61 by means of the port 65 in the valve 43.

The operation of the embodiment of my invention illustrated may be as follows. The valve 43 being in neutral position, Fig. 10, the feed cylinder is fixed in operative relation to any suitable support or abutment. The control handle 45 may then be turned rather rapidly until the valve takes the position illustrated in Figure 12, thereby admitting a small amount of air to the cylinder 35 to press the tool against the work. When properly positioned the valve may then be turned to the position shown in Fig. 14, thus cutting off air from the tube 30, admitting water in its place, admitting full pressure to the feed mechanism and starting the tool slowly to "spot" the rock at the place where it is desired to drill the hole. The admission of air to the tool also admits air to the hole 31 in the hollow drill steel as before described so that a spray of air and water are discharged at the point of the drill bit while the percussive mechanism is in operation. The hole being properly "spotted" the valve is turned to the position illustrated in Fig. 15 and then to Fig. 16 in which position the drill is operating at full speed, under full feeding pressure, unless the latter is restrained by the operator by friction of the brake 40. It is frequently desirable to use this friction because excessive pressure may retard rotation of the drill which may slow down the percussive mechanism or cause the latter to "short-stroke." After the hole is drilled to the desired depth, or it is necessary to insert a longer drill steel, the valve is turned to the position shown in Fig. 17, wherein the supply of air to the drilling engine and of air and water to the drill steel are both interrupted, and the air is exhausted from the rear of the cylinder 35 and admitted to the front end of the cylinder 35 to withdraw the drill steel. If the latter sticks, the valve may be turned to the position shown in Fig. 18 so that the drill steel will be shaken by percussive action and rotated to assist in freeing it while the steady retractive pull of the feed mechanism continues. If desired, by turning the valve to the position shown in Fig. 19 water is turned into the tube 30 to assist retraction while the other mechanisms function as in Fig. 18 before described.

When the drilling operation is to be discontinued it is desirable that the valve be turned to the position shown in Fig. 11 so that an air blast through the tube may thoroughly clean and dry it. Then the valve should be turned to the neutral position shown in Fig. 10. It should now be apparent that by the use of the described apparatus a very complete and wide range of control of the machine is obtainable by simple controlling means, so arranged that there is no possibility of the operator making any mistake, and the desired operations take place in their proper sequence without confusion, by merely turning the controlling handle.

While I have herein shown and described one specific embodiment of my invention for illustrative purposes and have disclosed and discussed in detail the construction, arrangement and operation incidental to a preferred construction thereof, it is to be understood that the invention is limited neither to the mere details or relative arrangement of parts nor to its specific embodiment herein shown and described but that extensive deviations from the described form and operation of the invention may be made without departing from the principles thereof.

Having thus described my invention, what I claim and desire by Letters Patent to procure is:

1. A rock drill comprising, in combination, a cylinder, a percussive piston therein, a hollow drill steel, conduit means for conducting gaseous fluid at substantially inlet pressure from said cylinder to said hollow drill steel when said percussive piston is in operation, independent supplemental conduit means for conducting gaseous fluid to said hollow drill steel when said percussive piston is not in operation, and a single controlling means adaptable to control the flow through each of said conduits operative to interrupt flow through the one when it is taking place through the other.

2. A rock drill comprising, in combination, a cylinder, a percussive piston therein, a hollow drill steel, conduit means for conducting gaseous fluid from said cylinder to said drill steel when said piston is in operation, supplemental conduit means communicating with said drill steel, and a single means for controlling the operation of said piston and for supplying fluid to said first mentioned conduit means and supplying liquid only to said last mentioned conduit means as said piston is placed in operation.

3. A rock drill comprising, in combination, a cylinder, a percussive piston therein, a hollow drill steel, conduit means for conducting gaseous fluid from said cylinder to said drill steel when said piston is in operation, supplemental conduit means for conducting gaseous fluid to said drill steel when said percussive piston is not in operation and for conducting liquid to said steel, and a single controlling means for successively supplying gaseous fluid and liquid to said last mentioned conduit means, said controlling means being operative to supply gaseous fluid to said last mentioned conduit means only when said piston is not in operation.

4. A rock drill comprising, in combination, a cylinder, a percussive piston therein, a hollow drill steel, conduit means for conducting gaseous fluid from said cylinder to said drill steel when said piston is in operation, independent supplemental conduit means for conducting fluid to said drill steel, and a single controlling valve for said piston and for each of said conduit means having ports adapted to supply either gaseous fluid or liquid but not both together to said last mentioned conduit means.

5. A rock drill comprising, in combination, a cylinder, a percussive piston therein, a hollow drill steel, conduit means for conducting gaseous fluid from said cylinder to said hollow drill steel when said percussive piston is in operation, supplemental independent conduit means for conducting gaseous fluid to said hollow drill steel when said percussive piston is not in operation, and controlling means having ports providing for alternative but not concurrent admission of gaseous fluid to said cylinder and to said supplemental conduit means.

6. A rock drill comprising, in combination, a cylinder, a percussive piston therein, a hollow drill steel, conduit means for conducting gaseous fluid from said cylinder to said hollow drill steel when said percussive piston is in operation, supplemental conduit means for conducting gaseous fluid to said hollow drill steel independently of said first mentioned conduit means, and a controlling device for permitting admission of gaseous fluid to said cylinder and to said supplemental conduit means in alternation but not simultaneously.

7. A rock drill comprising, in combination, a cylinder, a percussive piston therein, a hollow drill steel, conduit means for conducting gaseous fluid from said cylinder to said hollow drill steel when said percussive piston is in operation, supplemental conduit means for conducting gaseous fluid or liquid to said hollow drill steel, and controlling means operative to cause gaseous fluid supply to said second mentioned conduit means when said piston is not in operation and to cause liquid supply only thereto when said piston is in operation.

8. A percussive drill comprising, in combination, a cylinder, a percussive piston, a drill steel having a longitudinal aperture therein, means for supplying gaseous fluid from said cylinder at substantially inlet pressure to said aperture during operation of said piston, a conduit for conducting cleansing fluid to said aperture, and controlling means for said piston having ports arranged to supply gaseous fluid or liquid alternatively but not simultaneously to said conduit.

9. A percussive drill comprising, in combination, a cylinder, a percussive piston, a drill steel having a longitudinal aperture therein, a conduit for conducting cleansing fluid to said aperture, controlling means having ports arranged to supply air or water alternatively but not simultaneously to said conduit, and conduit means for conducting air from said cylinder to said aperture, said controlling means on movement to shut down condition causing the supply of air to said conduit after the supply of water thereto has been stopped.

10. The combination of a pressure fluid tool having a cylinder, a piston reciprocable therein, a drill steel having an aperture extending longitudinally therein, a tube for conducting fluid to said aperture to expel the cuttings, and a controlling device having ports so arranged that when said device is in one position it opens communication from the pressure fluid supply to said cylinder and from the liquid supply to said tube while interrupting communication between said pressure fluid supply and said tube, and when in another position said device opens communication from the pressure supply to said tube, while interrupting communication from said pressure supply to said cylinder and from said liquid supply to said tube.

11. The combination of a pressure fluid tool having a cylinder, a piston reciprocable therein, a drill steel having an aperture extending longitudinally therein, a tube for conducting fluid to said aperture to expel the cuttings, and a controlling device having ports so arranged that when said device is in one position it opens communication from the pressure fluid supply to said cylinder and from the liquid supply to said tube while interrupting communication between said pressure fluid supply and said tube, and pressure fluid conduit means to conduct pressure fluid from said cylinder to said aperture.

12. The combination of a pressure fluid tool having a cylinder, a piston reciprocable therein, a drill steel having an aperture extending longitudinally therein, a tube for conducting fluid to said aperture to expel the cuttings, and a controlling device having ports so arranged that when said device is in one position it opens communication from the pressure fluid supply to said cylinder and from the liquid supply to said tube while interrupting communication between said pressure fluid supply and said tube, pressure fluid conduit means to conduct pressure fluid from said cylinder to said aperture, and when in another position said device opens communication from the pressure supply to said tube, while interrupting communication from said pressure supply to said cylinder and from said liquid supply to said tube.

13. Drilling apparatus comprising, in combination, a drill cylinder, a percussive piston, a hollow drill steel, elastic fluid actuated feeding means for advancing said drill cylinder and associated parts toward the work, conduit means for conducting cleansing fluid to said hollow drill steel, an aperture for admitting pressure fluid from said drill cylinder to said hollow drill steel when pressure fluid is admitted to said cylinder, and a controlling device for coordinately controlling the admission of pressure fluid to said feeding means, to said drill cylinder and the admission of cleansing fluid to said conduit means, said controlling device having ports so arranged that in one position communication is opened between the pressure fluid supply and said feeding means, between the pressure fluid supply and said drill cylinder and between the liquid supply and said conduit means, while the direct supply of pressure fluid to said conduit means is cut off, and so arranged that in another position communication is opened between said pressure fluid supply and said conduit means, while communication is cut off between the pressure fluid supply and said cylinder and between the liquid supply and said conduit means.

14. Drilling apparatus comprising, in combination, a drill cylinder, a percussive piston, a hollow drill steel, elastic fluid actuated feeding means for advancing said drill cylinder and associated parts toward the work, conduit means for conducting cleansing fluid to said hollow drill steel, an aperture for admitting pressure fluid from said drill cylinder to said hollow drill steel when pressure fluid is admitted to said cylinder, and a controlling device for coordinately controlling the admission of pressure fluid to said feeding means, to said drill cylinder and the admission of cleansing fluid to said conduit means, said controlling device having ports so arranged that in one position communication is opened between the pressure fluid supply and said feeding means, between the pressure fluid supply and said drill cylinder and between the liquid supply and said conduit means, while the direct supply of pressure fluid to said conduit means is cut off, and so arranged that in another position communication is opened between said pressure fluid supply and said conduit means, and between said pressure fluid supply and said feeding means, while communication is cut off between the pressure fluid supply and said cylinder and between the liquid supply and said conduit means.

15. Drilling apparatus comprising, in combination, a drill cylinder, a percussive piston, a hollow drill steel, elastic fluid actuated retraction means for retracting said drill cylinder and associated parts from the work, conduit means for conducting cleansing fluid to said hollow drill steel, an aperture for admitting pressure fluid from said drill cylinder to said hollow drill steel when pressure fluid is admitted to said cylinder, and a controlling device for coordinately controlling the admission of pressure fluid to said retracting means, to said drill cylinder and the admission of cleansing fluid to said conduit means, said controlling device having ports so arranged that in one position communication is opened between the pressure fluid supply and said retraction means, between the pressure fluid supply and said drill cylinder and between the liquid supply and said conduit means, while the direct supply of pressure fluid to said conduit means is cut off, and so arranged that in another position communication is opened between said pressure fluid supply and said conduit means and between said pressure fluid supply and said retraction means, while communication is cut off between the pressure fluid supply and said cylinder and between the liquid supply and said conduit means.

16. Drilling apparatus comprising, in combination, a drilling engine having a cylinder, a piston reciprocable therein, a drill steel, an aperture disposed longitudinally of said drill steel, air conduit means for conducting air to said apparatus, water conduit means for conducting water to said apparatus, tubular means for conducting air or water to said aperture, an opening adjacent the juncture of said tubular means and said aperture for conducting air from said cylinder to said aperture, and a controlling device having ports so arranged that when said device is in one position communication is established between said air conduit means and said aperture through said cylinder and through said tubular means between said water conduit means only and said aperture, and when said controlling device is in another position communication is established between said air conduit means and said aperture through said tubular means.

17. Drilling apparatus comprising, in combination, a drill cylinder, a percussive piston reciprocable therein, a hollow drill steel having a longitudinal perforation, a tube extending longitudinally of said cylinder, through an axial perforation in said piston, and entering said longitudinal perforation in said drill steel, air conducting means for conducting air to the rear end of said tube, water conducting means for conducting water to the rear end of said tube, motive fluid conducting means for conducting motive fluid to said cylinder, and a controlling device having ports so arranged that when said device is in one position it opens communication between the pressure fluid supply and said cylinder, and between the liquid supply only and said tube, and when said device is in another position it closes communication between the pressure fluid supply and said cylinder and opens communication between the pressure fluid supply and said tube.

18. Drilling apparatus comprising, in combination, a drill cylinder, a piston reciprocable therein, a drill steel having a longitudinal perforation therein, fluid conduit means to conduct fluid to said perforation to expel the cuttings, a pressure fluid supply conduit to conduct elastic pressure fluid to said apparatus, a liquid supply conduit to conduct liquid to said apparatus, conduit means to conduct live air from said drill cylinder to said perforation, communications between said pressure fluid supply conduit and said fluid conduit means, communications between said pressure fluid supply conduit and said cylinder, and a controlling device having ports so arranged that when said device is in one position communications are opened between the pressure fluid supply conduit and said cylinder, and between said liquid supply conduit and said fluid conduit means, while pressure fluid is introduced to said perforation only from said drill cylinder, and in another position closing communication between said pressure fluid supply conduit and said cylinder means and between said liquid supply conduit and said fluid conduit means while opening communication between said pressure fluid supply conduit and said fluid conduit means.

19. Drilling apparatus comprising, in combination, percussive means, a hollow drill steel, a tube for conducting cleansing fluid to said hollow drill steel, controlling means providing ports so arranged that in one position of said controlling means communication is open between the air supply and said percussive means and between the liquid supply and said tube, while communication is interrupted between the air supply and said tube, providing a neutral position wherein all communications are interrupted, and an intermediate position wherein communication between the water supply and said tube is interrupted while communication between the air supply and said tube is opened.

20. A rock drilling apparatus comprising, in combination, a drill bit, a fluid pressure percussive motor for actuating the same, and valve means successively assuming in fixed sequence on movement thereof positions to supply live gaseous fluid to said drill bit, to supply liquid only to said drill bit, and to supply gaseous fluid to said motor while maintaining the supply of liquid to said drill bit, said apparatus having provision for delivering the exhaust of said motor to said drill bit.

21. Drilling apparatus comprising a percussive motor, a drill steel having a longitudinal aperture therein and adapted to be actuated by said motor, means for supplying simultaneously gaseous fluid at substantially inlet pressure and liquid cleansing fluid to said aperture including a conduit for conducting cleansing fluid to said aperture, and a throttle valve for said motor having ports arranged to supply gaseous or liquid cleansing fluid alternatively but not simultaneously to said conduit.

22. Drilling apparatus comprising, in combination, a motor comprising a cylinder, a percussive piston therein, and a throttle valve, a drill steel disposed for actuation by said piston and having a longitudinal aperture therein, and means for supplying simultaneously gaseous fluid at substantially inlet pressure and liquid cleansing fluid to said aperture including a cleansing fluid supply tube supported by said cylinder and adapted to conduct gaseous and liquid cleansing fluids to said aperture, said throttle valve providing ports arranged to supply gaseous fluid and liquid alternatively but not simultaneously to said conduit.

In testimony whereof, I have signed my name to this specification.

GEORGE H. GILMAN.